United States Patent
Kajimoto

(10) Patent No.: US 12,282,559 B2
(45) Date of Patent: Apr. 22, 2025

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Masahiro Kajimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 17/935,484

(22) Filed: Sep. 26, 2022

(65) Prior Publication Data

US 2023/0101600 A1 Mar. 30, 2023

(30) Foreign Application Priority Data

Sep. 27, 2021 (JP) .................... 2021-156318

(51) Int. Cl.
*G06F 11/14* (2006.01)
*G06F 21/57* (2013.01)

(52) U.S. Cl.
CPC ........ *G06F 21/575* (2013.01); *G06F 11/1417* (2013.01); *G06F 2201/84* (2013.01); *G06F 2221/034* (2013.01)

(58) Field of Classification Search
None
See application file for complete search history.

(56) References Cited

FOREIGN PATENT DOCUMENTS

JP 2014099097 A 5/2014

OTHER PUBLICATIONS

Foreign document (Year: 2021).*

* cited by examiner

*Primary Examiner* — Cai Y Chen
(74) *Attorney, Agent, or Firm* — Canon U.S.A., Inc. IP Division

(57) ABSTRACT

In the configuration of the related art, a verification system for detecting bit corruption is booted while verifying a main program, so that a secure boot function and an automatic recovery function cannot be implemented. According to various embodiments of the present disclosure, an information processing apparatus including a non-volatile storage unit configured to store a boot program for booting a system and a backup program for the boot program includes a first verification unit configured to verify whether the backup program is valid, and a second verification unit configured to verify whether firmware for controlling a predetermined member is valid, wherein the first verification unit verifies whether the backup program is valid during a period in which the second verification unit verifies whether the firmware is valid.

11 Claims, 10 Drawing Sheets

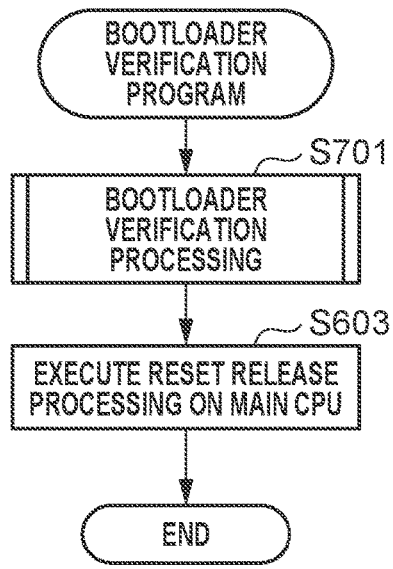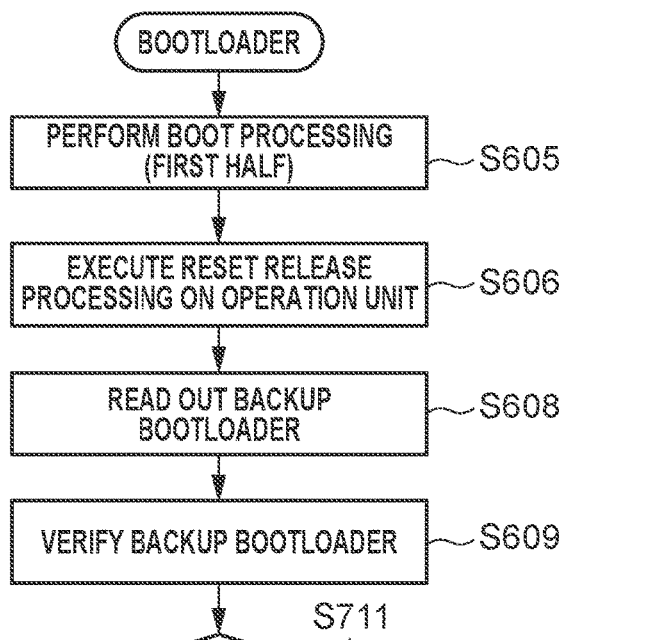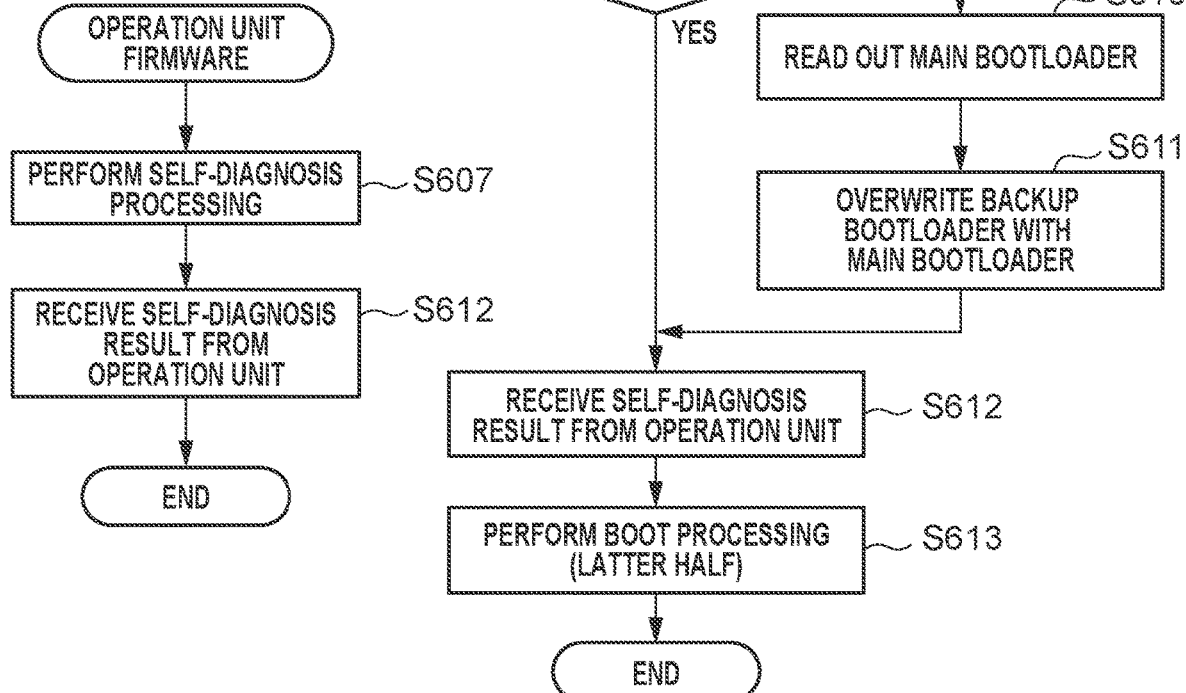

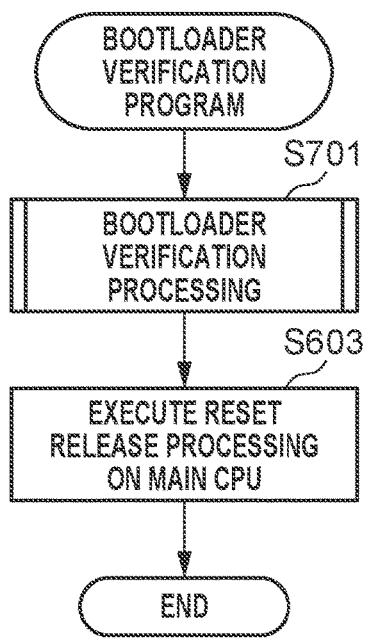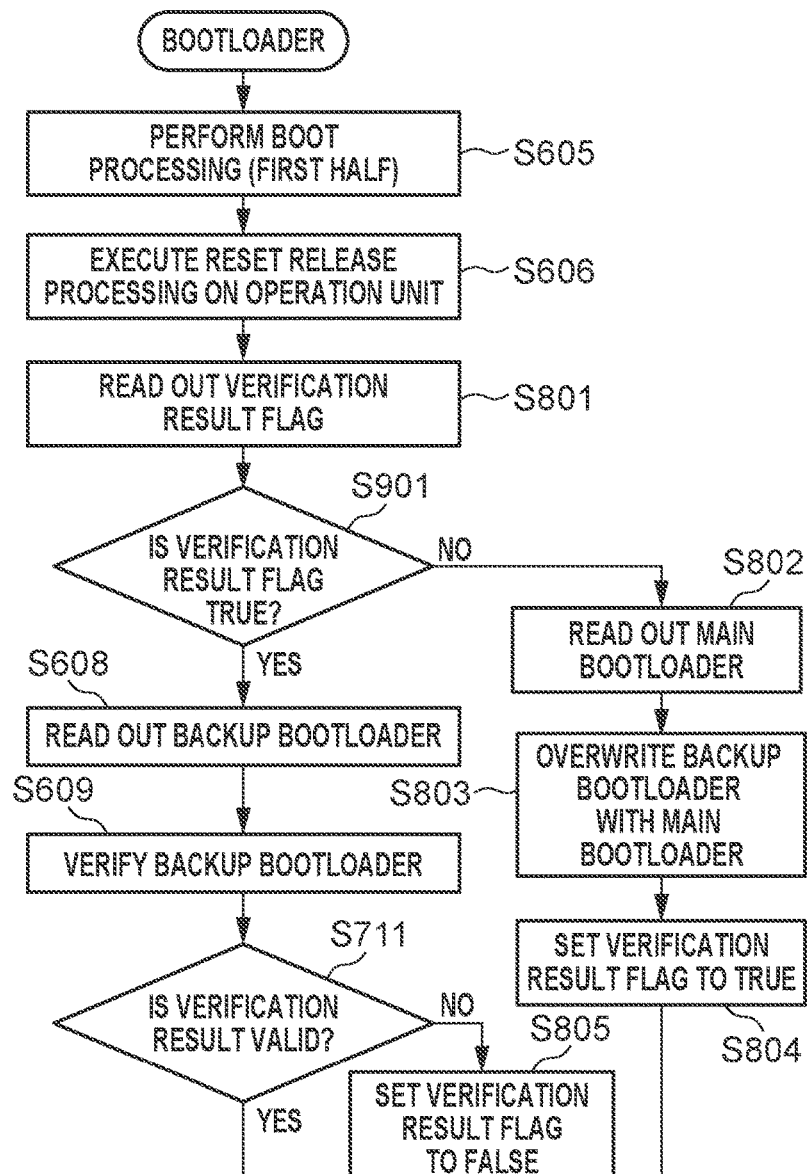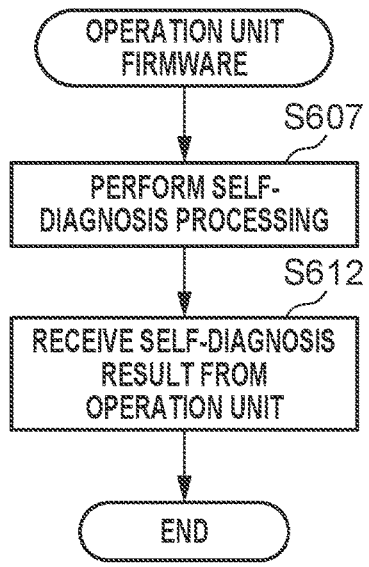

INFORMATION PROCESSING APPARATUS AND CONTROL METHOD FOR INFORMATION PROCESSING APPARATUS

BACKGROUND

Field

The present disclosure relates to an information processing apparatus and a control method for the information processing apparatus.

Description of the Related Art

The recent increase in the number of types of devices to be connected on a network increases users' concern about network security, and there is also a demand for reinforcing the security of image forming apparatuses. As one of security functions, a function called "secure boot" in which a program is verified at boot time is widely known. This secure boot function is implemented based on the concepts of Root of Trust (RoT) and Chain of Trust (CoT). The term "RoT" refers to a hardware or software component that is implemented by hardware or protected by hardware and is designed to be secure against an attack from an outside.

Programs to be subsequently booted are verified with the RoT as a starting point, and only the programs for which the verification result is determined to be valid are sequentially booted to thereby form CoT.

An image forming apparatus uses an embedded controller (EC) or the like as RoT, and the EC verifies a basic input/output system (BIOS)/Bootloader. Then, CoT is formed in a processing flow in which the BIOS/Bootloader verifies kernel/initrd and then the kernel/initrd verifies rootfs, thereby implementing the secure boot function. Some image forming apparatuses include an automatic recovery function for recovering a program such that, if it is determined that the verification result is invalid in the above-described processing, the backup program is overwritten.

If a backup program is held to implement the above-described automatic recovery function, two types of programs, i.e., a main program and a backup program are held. Verification processing to be performed on the two programs doubles the verification time. Accordingly, the automatic recovery function is generally designed to verify the backup program only after it is determined that the verification result of the main program is invalid and there is a need to recover the program.

SUMMARY

According to various embodiments of the present disclosure, an information processing apparatus including a non-volatile storage unit configured to store a boot program for booting a system and a backup program for the boot program includes a first verification unit configured to verify whether the backup program is valid, and a second verification unit configured to verify whether firmware for controlling a predetermined member is valid, wherein the first verification unit verifies whether the backup program is valid during a period in which the second verification unit verifies whether the firmware is valid.

Further features of the present disclosure will become apparent from the following description of example embodiments with reference to the attached drawings.

BRIEF DESCRIPTION OF THE DRAWINGS

FIGS. 7A to 7C are flowcharts illustrating verification processing and recovery processing on the backup bootloader according to one embodiment.

FIGS. 9A to 9C are flowcharts illustrating verification processing and recovery processing on the backup bootloader according to one embodiment.

DESCRIPTION OF THE EMBODIMENTS

Example embodiments of the present disclosure will be described in detail with reference to the accompanying drawings. The following example embodiments are not meant to limit the scope of the present invention as encompassed by the appended claims, and not all combinations of features described in the example embodiments are essential to every solution of the present disclosure. While the example embodiments illustrate an example where an image processing apparatus is described as an example of an information processing apparatus according to the present disclosure, the information processing apparatus according to the present disclosure is not limited to this example.

Japanese Patent Application Laid-Open No. 2014-99097 discusses a technique of executing verification processing in parallel with boot processing, instead of executing boot processing after completion of program verification processing. This technique makes it possible to reduce a time required to be ready for reception of an input from a user.

However, in the configuration of the related art, the boot time for the entire system that is the sum of the time for verification processing and the time for boot processing cannot be reduced. In the configuration of the related art, a verification system for detecting bit corruption is booted while verifying the main program, so that the secure boot function and the automatic recovery function cannot be implemented.

Figure 1:
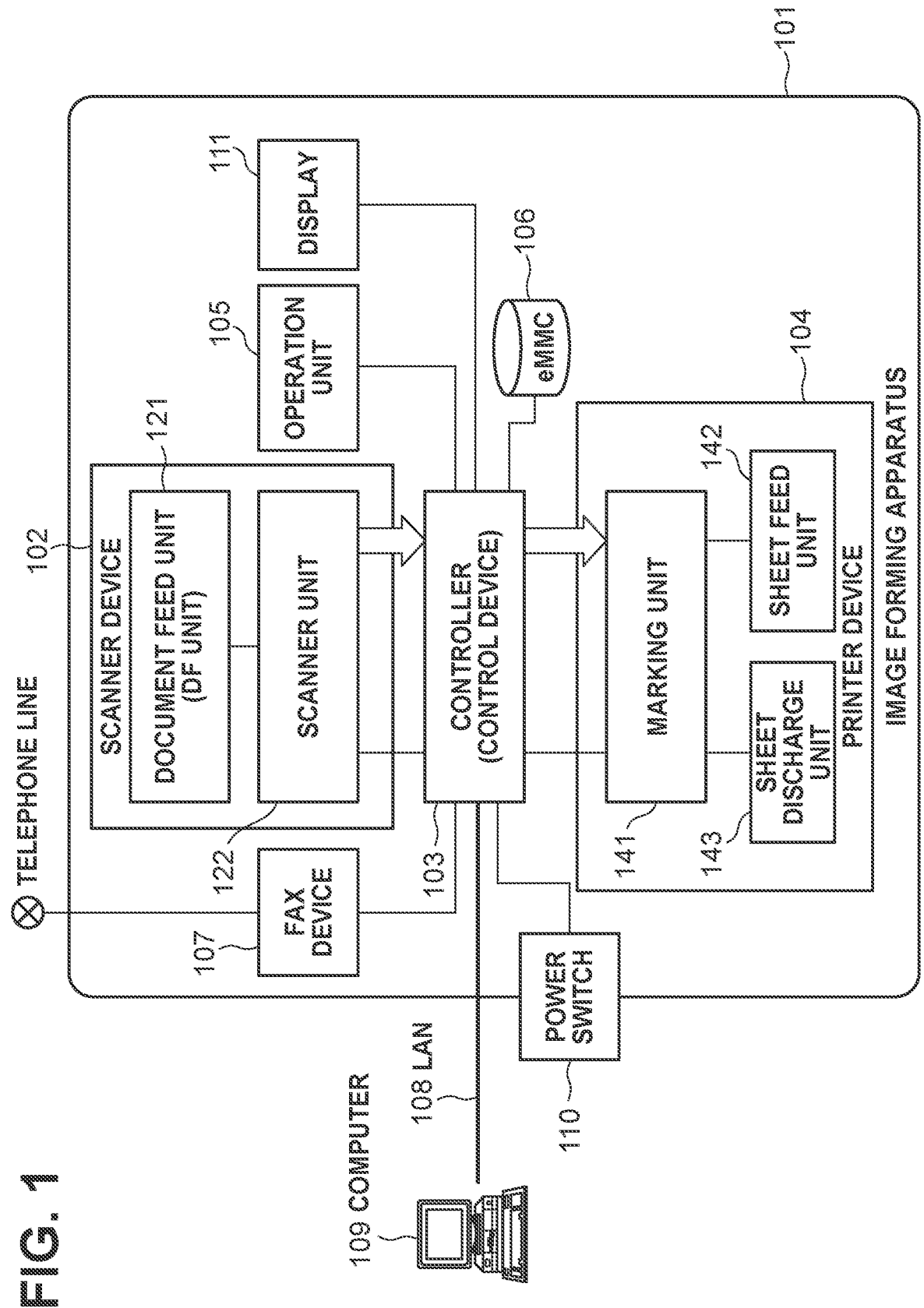
FIG. 1 is a block diagram illustrating a configuration example of an image forming apparatus according to a first example embodiment.

FIG. 1 is a block diagram illustrating a configuration example of an image forming system according to an example embodiment of the present disclosure. The present example embodiment illustrates an example where a multi-function peripheral including a print function, a scanner function, and a data communication function is used as the image forming system.

As illustrated in FIG. 1, an image forming apparatus 101 is configured to receive jobs from a computer 109 via a local area network (LAN) 108. Two or more computers 109 may be connected. A scanner device 102 optically scans an image on a document and converts the image into image data.

A printer device 104 prints the image data on a print medium such as a sheet. An operation unit 105 includes a touch panel and hardware keys for receiving settings about the image forming apparatus 101 from a user. The operation unit 105 also includes a processing unit that is provided separately from a controller 103 to be described below.

A display 111 displays an operation status of the image forming apparatus 101. When the touch panel is used as the operation unit 105, the operation unit 105 is mounted on the surface of the display 111. An embedded multimedia card (eMMC) 106 is a non-volatile semiconductor storage device that stores digital images, control programs, and the like.

The term "eMMC" used herein is a registered trademark of Joint Electron Device Engineering Council (JEDEC)/MultiMediaCard Association (MMCA).

Instead of using the eMMC 106 illustrated in FIG. 1, a non-volatile magnetic storage device such as a hard disk drive (HDD) or a non-volatile semiconductor storage device such as a solid-state drive (SSD) may be used. A facsimile (FAX) device 107 transmits and receives digital images to and from a telephone line or the like. The controller 103 is connected to the scanner device 102, the printer device 104, the operation unit 105, the eMMC 106, the FAX device 107, and the display 111, and issues instructions to each module to thereby execute jobs on the image forming apparatus 101.

The image forming apparatus 101 can also input and output digital images, issue jobs, and issue instructions for devices and the like using the computer 109 via the LAN 108. The scanner device 102 includes a document feed unit 121 and a scanner unit 122. The document feed unit 121 is configured to automatically and sequentially replace bundles of documents. The scanner unit 122 is configured to optically scan an image on a document and convert the image into image data. The converted image data is transmitted to the controller 103.

The printer device 104 includes a sheet feed unit 142, a marking unit 141, and a sheet discharge unit 143. The sheet feed unit 142 is configured to sequentially feed sheets one by one from a sheet bundle. The marking unit 141 is configured to print image data on a fed sheet. The sheet discharge unit 143 is configured to discharge printed sheets. A finisher device (not illustrated) performs processes, such as discharge, sorting, stapling, punching, and cutting, on the sheets output from the sheet discharge unit 143 of the printer device 104 in the image forming apparatus 101.

The image forming apparatus 101 also includes a power switch 110 connected to the controller 103. When the power switch 110 is turned on, power is fed to at least the operation unit 105 and a part of a main board of the controller 103. Even after the power switch 110 is turned off, power feeding is not immediately stopped. Power feeding to parts, such as a part of a power control unit, other than a part required for turning on the power switch 110 is stopped after completion of software or hardware termination processing.

<Functions of System>

Examples of jobs (functions) that can be executed by the image forming apparatus 101 will be described below.

[Copy Function]

The image forming apparatus 101 includes a copy function for recording image data generated by the scanner device 102 on the eMMC 106 and performing printing using the printer device 104 based on the recorded image data.

[Image Transmission Function]

The image forming apparatus 101 includes an image transmission function for transmitting image data generated by the scanner device 102 to the computer 109 via the LAN 108.

[Image Storage Function]

The image forming apparatus 101 includes an image storage function for storing image data generated by the scanner device 102 into the eMMC 106 and performing image transmission and image printing, as needed.

[Image Print Function]

The image forming apparatus 101 includes an image print function for analyzing, for example, a page description language transmitted from the computer 109 and performing printing using the printer device 104.

<Configuration of Operation Unit 105>

The operation unit 105 is connected to the controller 103 and includes a liquid crystal device (LCD) touch panel, a power saving button, a copy button, a cancel button, a reset button, a numeric keypad, and a user mode key. The operation unit 105 provides a user interface (I/F) for operating an image input/output system.

Figure 2:
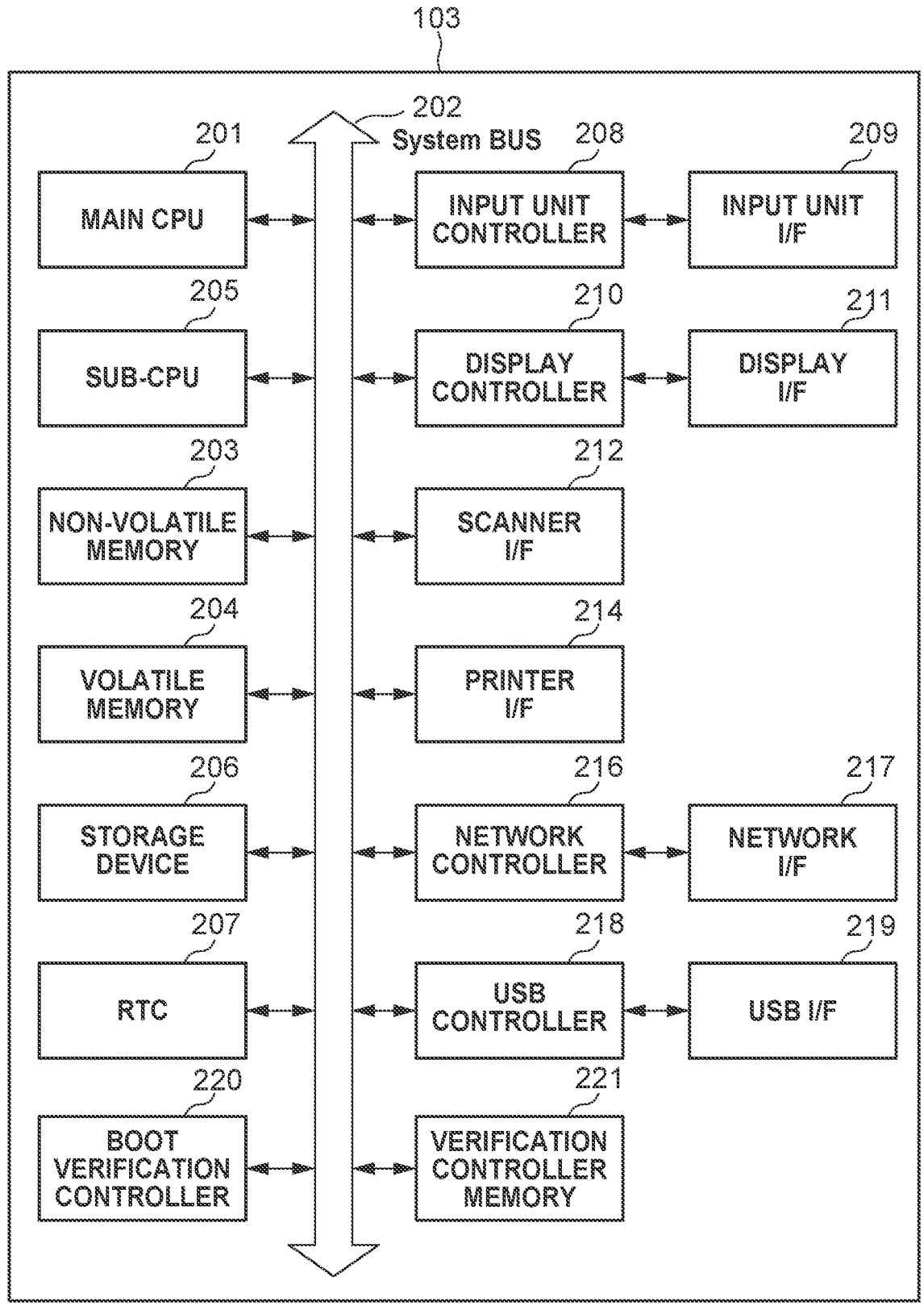
FIG. 2 is a block diagram illustrating a hardware configuration example of a controller according to one embodiment.

FIG. 2 is a block diagram illustrating a hardware configuration example of the controller 103 of the image forming apparatus 101. A configuration example of the controller 103 of the image forming apparatus 101 will be described with reference to FIG. 2.

A main CPU 201 is a central processing unit (CPU) of the controller 103 that executes a program for causing the image forming apparatus 101 to operate. The program to be executed by the main CPU 201 is loaded from a non-volatile memory 203 or a storage device 206 into a volatile memory 204, and the loaded program is executed. Examples of the non-volatile memory 203 include a serial peripheral interface (SPI) flash memory. Examples of the storage device 206 include an eMMC.

A system bus 202 (System BUS) is a path for the main CPU 201 to access another unit, or is a path for other units to access each other.

A sub-CPU 205 is a CPU of the controller 103 that monitors an interrupt from each hardware module when the image forming apparatus 101 is in a power saving mode, and activates the main CPU 201 upon occurrence of an interrupt. In the present example embodiment, the sub-CPU 205 is also used for program verification at boot time.

A network controller 216 establishes communication between the image forming apparatus 101 and other devices on a network via a network I/F 217.

A universal serial bus (USB) controller 218 controls communication between the image forming apparatus 101 and a USB device via a USB I/F 219. While FIG. 2 illustrates only one USB I/F 219, two or more USB I/Fs 219 may be present.

A display controller 210 controls display of the display 111 via a display I/F 211. An input unit controller 208 communicates with the operation unit 105 to receive an instruction issued from the user to the image forming apparatus 101 via an input unit I/F 209. A real-time clock (RTC) 207 includes a clock function, an alarm function, and a timer function for the image forming apparatus 101.

The image forming apparatus 101 is connected to the scanner device 102 via the system bus 202 and a scanner I/F 212. The image forming apparatus 101 is also connected to the printer device 104 via the system bus 202 and a printer I/F 214. A boot verification controller 220 is a processing unit that includes a CPU and operates first at power-on. Specifically, the boot verification controller 220 performs verification processing on programs stored in the non-volatile memory 203 based on verification programs, keys, and address information stored in a verification controller memory 221.

Figure 3:
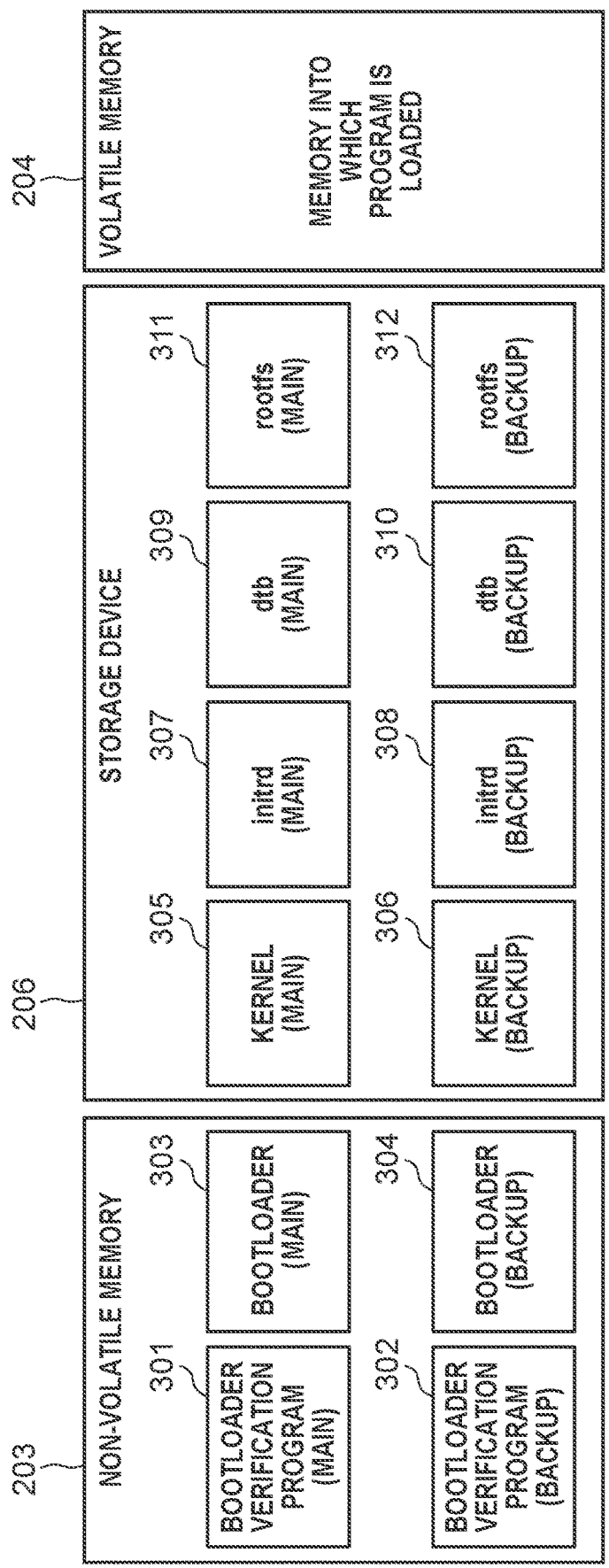
FIG. 3 is a block diagram illustrating programs according to one embodiment.

FIG. 3 is a block diagram illustrating programs used for an automatic recovery function according to the present example embodiment. Configuration examples of the programs according to the present example embodiment will be described with reference to FIG. 3.

A bootloader verification program (main) 301 is a program for verifying a bootloader (boot program) (main) 303 or a bootloader (boot program) (backup) 304. A bootloader verification program (backup) 302 is a copy of the bootloader verification program (main) 301. The bootloader (main) 303 verifies a kernel (main) 305, an initrd (main) 307, and a dtb (main) 309, and further verifies a kernel (backup) 306, an initrd (backup) 308, and a dtb (backup) 310, as needed. Further, the bootloader (main) 303 performs initialization processing and the like on each hardware module. The bootloader (backup) 304 is a copy of the bootloader (main) 303.

The kernel (main) 305 manages and executes the program of a rootfs (main) 311 or a rootfs (backup) 312 to be loaded into the volatile memory 204. The kernel (backup) 306 is a copy of the kernel (main) 305. The initrd (main) 307 is an initial rootfs used as a springboard before the rootfs (main) 311 is loaded into the volatile memory 204. The initrd (backup) 308 is a copy of the initrd (main) 307. The dtb (main) 309 includes setting information about each hardware module used by the kernel (main) 305 and the kernel (backup) 306. The dtb (backup) 310 is a copy of the dtb (main) 309. The rootfs (main) 311 is a program for implementing functions such as copy, print, and scan functions that are mainly used to operate the image forming apparatus 101. The rootfs (backup) 312 is a copy of the rootfs (main) 311.

Figure 4:
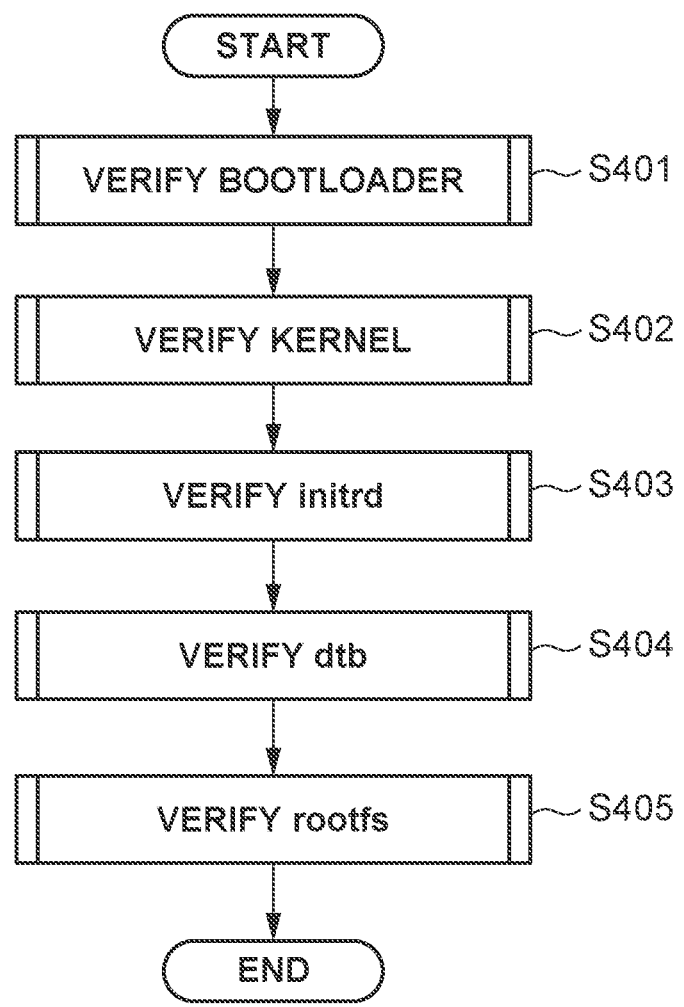
FIG. 4 is a flowchart illustrating boot processing for the image forming apparatus according to one embodiment.

FIG. 4 is a flowchart illustrating an outline of boot processing for the image forming apparatus 101. The boot processing for the image forming apparatus 101 will be described with reference to FIG. 4.

First, as described above with reference to FIG. 2, at power-on, the boot verification controller 220 starts processing to read out programs stored in the verification controller memory 221. The boot verification controller 220 verifies the bootloader verification program (main) 301 stored in the non-volatile memory 203. If it is determined that the verification result is valid, a reset state of the sub-CPU 205 is released. After completion of the processing of verifying the bootloader verification program, the sub-CPU 205 starts step S401.

In step S401, the sub-CPU 205 reads out the bootloader verification program (main) 301 and verifies the bootloader (main) 303. If it is determined that the verification result is valid, the reset state of the main CPU 201 is released.

The main CPU 201 reads out the bootloader (main) 303 and starts processing. The bootloader (main) 303 initializes each hardware module. Inn step S402, the kernel (main) 305 is verified. In step S403, the initrd (main) 307 is verified. In step S404, the dtb (main) 309 is verified. If the verification results of verifying the kernel, initrd, and dtb are valid, the kernel (main) 305, the initrd (main) 307, and the dtb (main) 309 are loaded into the volatile memory 204. In the subsequent processing, the verification target is sequentially switched from the bootloader (main) 303 to the kernel (main) 305 and the initrd (main) 307, and then the rootfs (main) 311 is verified.

If it is determined that the verification result is valid, the rootfs (main) 311 is loaded into the volatile memory 204 and the loaded rootfs (main) 311 is executed to thereby boot the system for the image forming apparatus 101.

Figure 5:
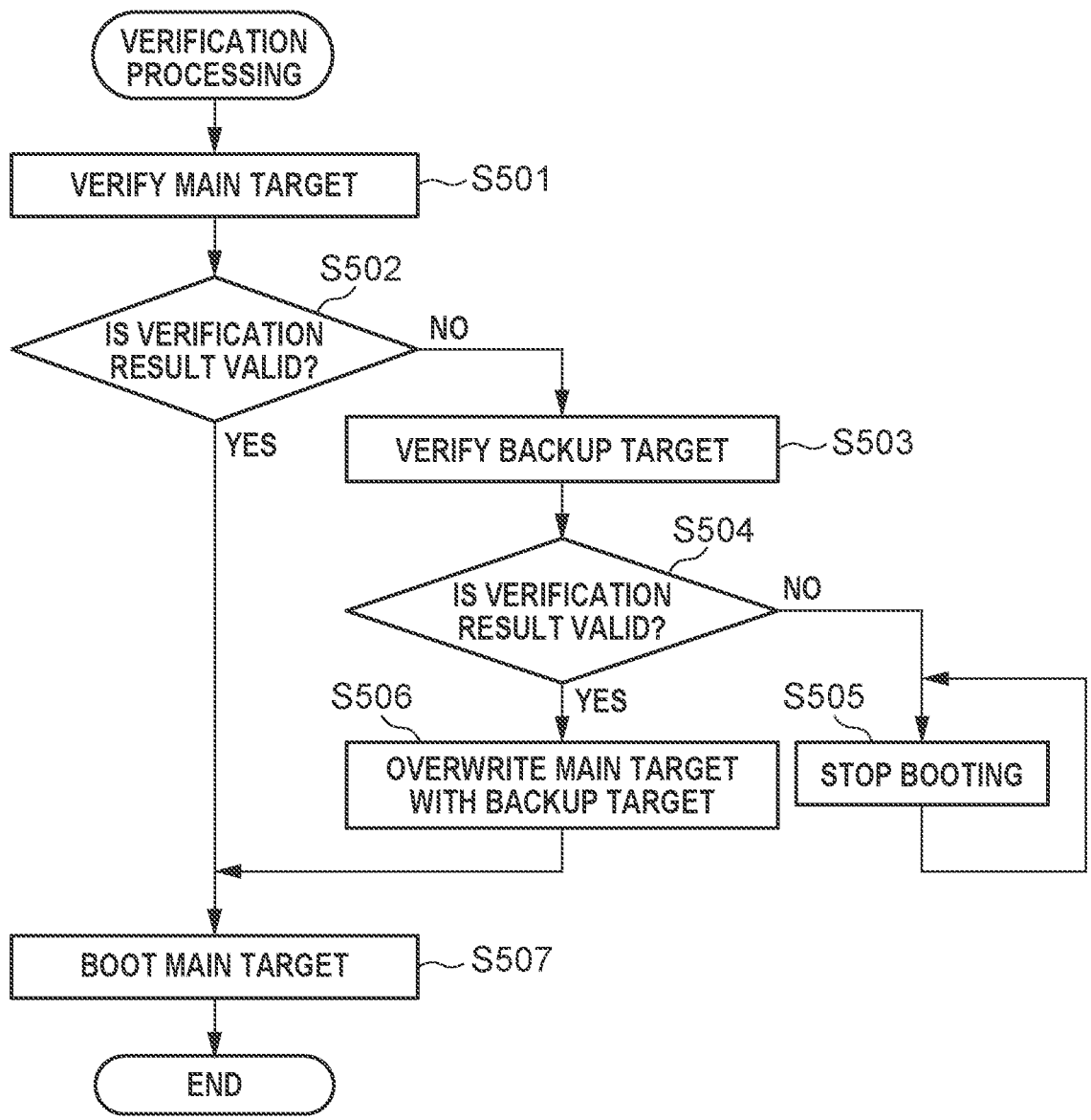
FIG. 5 is a flowchart illustrating verification processing and recovery processing for the image forming apparatus according to one embodiment.

FIG. 5 is a flowchart illustrating a series of processing flow from verification processing to recovery processing to implement the automatic recovery function. In the verification step illustrated in FIG. 4, the verification processing and recovery processing illustrated in FIG. 5 are carried out without fail. The verification processing and recovery processing are each performed by the subject of the verification step illustrated in FIG. 4.

In step S501, a main target is verified. In step S502, it is determined whether the verification result is valid. If it is determined that the verification result is valid (YES in step S502), the processing proceeds to step S507. In step S507, the main target is booted. On the other hand, if it is determined that the verification result is invalid (NO in step S502), the processing proceeds to step S503. In step S503, a backup target (backup corresponding to the main target) is verified. Next, in step S504, it is determined whether the verification result of the backup target is valid. If the verification result of the backup target is invalid (NO in step S504), the processing proceeds to step S505. In step S505, boot processing is stopped. If the verification result of the backup target is valid (YES in step S504), the processing proceeds to step S506. In step S506, the main target is overwritten with the backup target. In step S507, the main target is booted.

Figure 6:
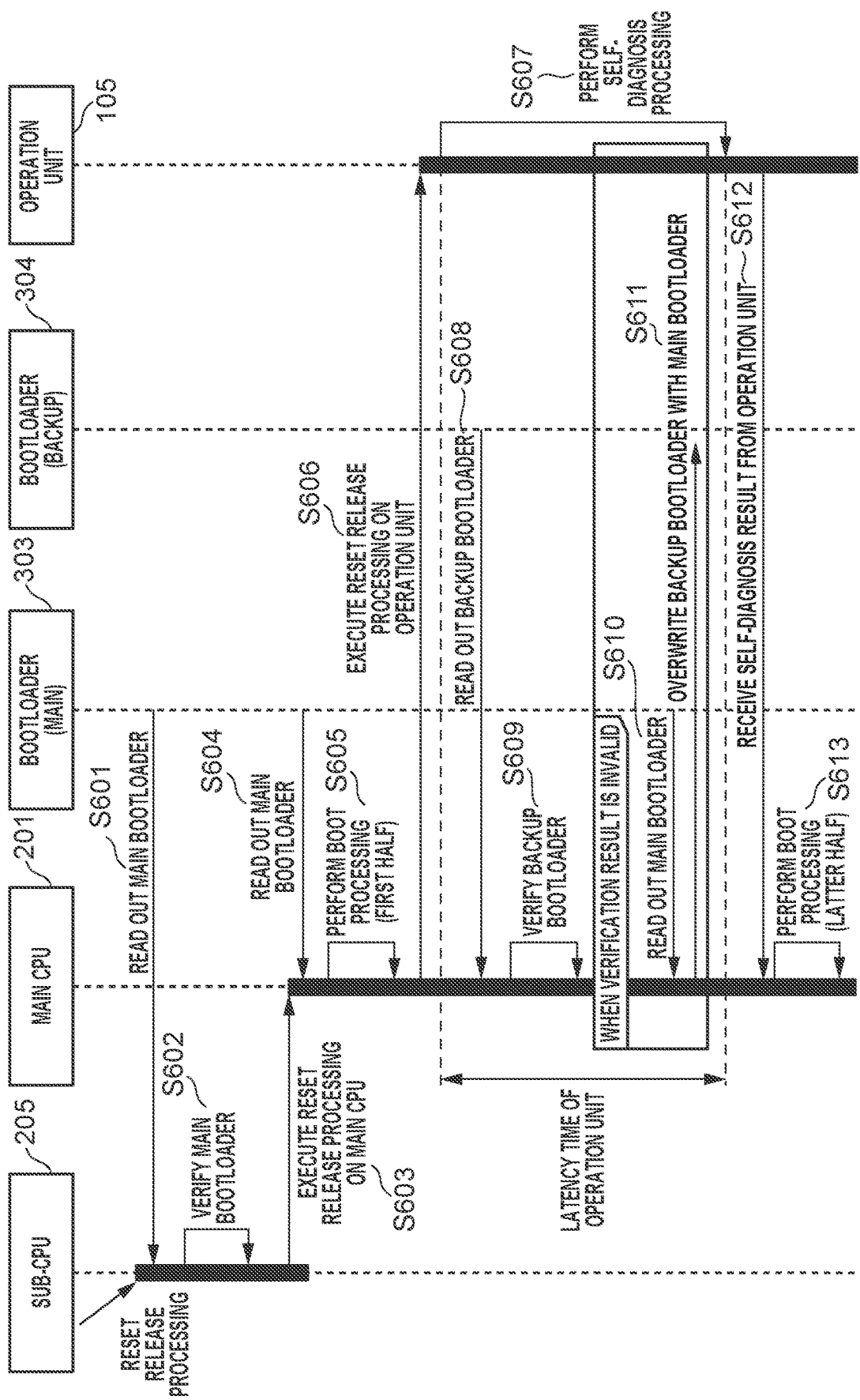
FIG. 6 is a sequence diagram illustrating verification processing and recovery processing on a backup bootloader according to one embodiment.

FIG. 6 is a timing diagram illustrating characteristic processing according to the present example embodiment. FIG. 5 is a flowchart illustrating the processing based on which the automatic recovery function is implemented. In the flow of boot processing illustrated in FIG. 5, verification processing on the backup target is executed only when the verification result of the main target is invalid. According to the present example embodiment, the verification processing is performed using a latency time of the operation unit 105 as illustrated in FIG. 6. The processing contents will be described below.

First, as described above with reference to FIG. 4, when the reset state of the sub-CPU 205 is released, in step S601, the sub-CPU 205 reads out the bootloader (main) 303. In step S602, the sub-CPU 205 verifies the bootloader (main) 303. If the verification result is valid, in step S603, the sub-CPU 205 executes reset release processing on the main CPU 201. When the reset state of the main CPU 201 is released, in step S604, the main CPU 201 reads out data on the bootloader (main) 303. In step S605, boot processing is performed. The boot processing in step S605 includes various register settings and boot parameter checking.

Next, in step S606, the main CPU 201 performs reset release processing to operate the operation unit 105. Firmware for operating the operation unit 105 runs separately from the controller 103 on the operation unit 105, and thus it may be desirable for the bootloader to communicate with the operation unit 105.

In step S607, the operation unit 105 performs self-diagnosis processing after the reset release processing. The self-diagnosis processing in step S607 is a function for diagnosing whether the firmware for the operation unit 105 is not damaged, or whether the firmware is normally booted to be ready for receiving an input from the user. During the self-diagnosis processing in step S607, the operation unit 105 cannot send a response to a notification from the bootloader, which causes a latency time for waiting for the response from the operation unit 105.

According to the present example embodiment, in step S608, the bootloader (backup) 304 is read out during the latency time of the operation unit 105. In step S609, the backup bootloader is verified. Thus, the verification processing is executed during the period corresponding to the latency time in the related art, thereby making it possible to verify the bootloader (backup) 304 without any influence on the boot time. In the present example embodiment, the verification processing in steps S608 and S609 is performed by the main CPU 201. Alternatively, the verification processing may be performed by another processing unit such as the sub-CPU 205.

If the result of the verification processing on the bootloader (backup) 304 in step S609 is invalid, in step S610, data on the bootloader (main) 303 for which the verification result is determined to be valid in step S602 is read out. In step S611, the bootloader (backup) 304 for which the verification result is determined to be invalid is overwritten with the bootloader (main) 303, thereby performing recovery processing. In this recovery processing, the overwrite processing in step S611 is performed without reverification because the bootloader (main) 303 is already verified in step S602. However, reverification may also be performed.

In the present example embodiment, the main CPU 201 performs the recovery processing in steps S610 and S611. Alternatively, another processing unit, such as the sub-CPU 205, may perform the recovery processing, like in the verification processing. After that, in step S612, the self-diagnosis processing result is received from the operation unit 105. In step S613, the boot processing is continuously performed. The present example embodiment illustrates an example where the latency time of the operation unit 105 is used. However, any other system may be used as long as the latency time is generated by the other system during boot processing.

In step S602, if the verification result of the bootloader (main) 303 is invalid, the sub-CPU 205 may be configured to boot the backup bootloader. In this case, in step S504, it is verified whether the backup bootloader is valid. If it is determined that the verification result is valid, the backup bootloader is booted (this processing corresponds to step S507). In this case, the overwrite processing in step S506 is not performed during the processing of steps S504 and S507, but instead is performed in waiting for a response of self-diagnosis processing. Specifically, after the sub-CPU 205 has booted the backup bootloader, the main CPU 201 performs the processing in steps S605 and S606 and does not perform the processing in steps S608, S609, and S611. Then, as the processing corresponding to step S610, the backup bootloader is read out, and as the processing corresponding to step S611, the main bootloader is overwritten with the backup bootloader. Then, the processing of steps S612 and S613 is performed.

FIGS. 7A to 7C are flowcharts illustrating the processing illustrated in FIG. 6. The processing illustrated in FIG. 7A is performed by the bootloader verification program. The processing illustrated in FIG. 7B is performed by the bootloader. The processing illustrated in FIG. 7C is performed by the firmware for the operation unit 105. The processing illustrated in FIGS. 7A to 7C will be described along with the processing illustrated in FIG. 6. Assume here that verification processing to be executed by the bootloader verification program is carried out.

In step S701, the processing illustrated in FIG. 5 is performed on the bootloader. The processing up to the reset release processing on the main CPU 201 in step S603 corresponds to the verification processing to be executed by the bootloader verification program.

Next, the bootloader performs processing. First, in step S605, the bootloader performs boot processing including various register settings. After that, in step S606, reset release processing is executed on the operation unit 105. After the reset release processing in step S606, the firmware for the operation unit 105 and the bootloader perform processing in parallel. After that, in step S608, the bootloader reads out the backup bootloader. In step S609, the backup bootloader is verified.

Whether to execute recovery processing is determined depending on the verification result. Accordingly, in step S711, it is determined whether the verification result is valid. If the verification result is valid (YES in step S711), the processing proceeds to step S612. In step S612, the self-diagnosis result is received from the operation unit 105. In step S613, the boot processing is continuously performed.

Although not illustrated in FIG. 6, if the self-diagnosis result received from the operation unit 105 indicates an error, the boot processing may be interrupted or reboot processing may be performed. On the other hand, if the verification result of the backup bootloader is invalid (NO in step S711), the processing proceeds to step S610. In step S610, the main bootloader is read out. In step S611, the backup bootloader is overwritten with the main bootloader.

Lastly, the processing to be performed by the firmware for the operation unit 105 will be described. As described above with reference to FIG. 1, the firmware for the operation unit 105 includes a processing unit that is provided separately from the controller 103. Accordingly, when the bootloader performs the reset release processing, in step S607, the firmware for the operation unit 105 performs self-diagnosis processing in parallel with the processing by the bootloader. After completion of the self-diagnosis processing, in step S612, a notification about the self-diagnosis result is provided to the bootloader. After that, subsequent processing is performed according to an operation by the user.

The present example embodiment illustrates an example where a latency time for waiting for the response from the operation unit 105 occurs. However, if the firmware performs self-diagnosis processing on a predetermined member illustrated in FIG. 1, a latency time for waiting for a response from the predetermined member may be used.

In the configuration according to the present example embodiment, it is both possible to enhance the robustness of the system using the automatic recovery function by increasing the number of verifications of the backup program and to prevent a decrease in user-friendliness by preventing an increase in the boot time for the entire apparatus.

The first example embodiment described above illustrates an example where the verification processing and recovery processing on the bootloader (backup) 304 are completed during the latency time for the self-diagnosis function of the operation unit 105. However, in some cases, the sum of a verification time and a recovery time may be longer than the latency time for the self-diagnosis function. According to a second example embodiment, verification processing is performed during the latency time, and if the verification result is invalid, information indicating that the verification result is invalid is stored. An example where recovery processing is performed at next boot time from an off state caused when the information processing apparatus shuts down will be described. Descriptions of components in the second example embodiment that are denoted by the same reference numerals as those in the first example embodiment will be omitted.

Figure 8:
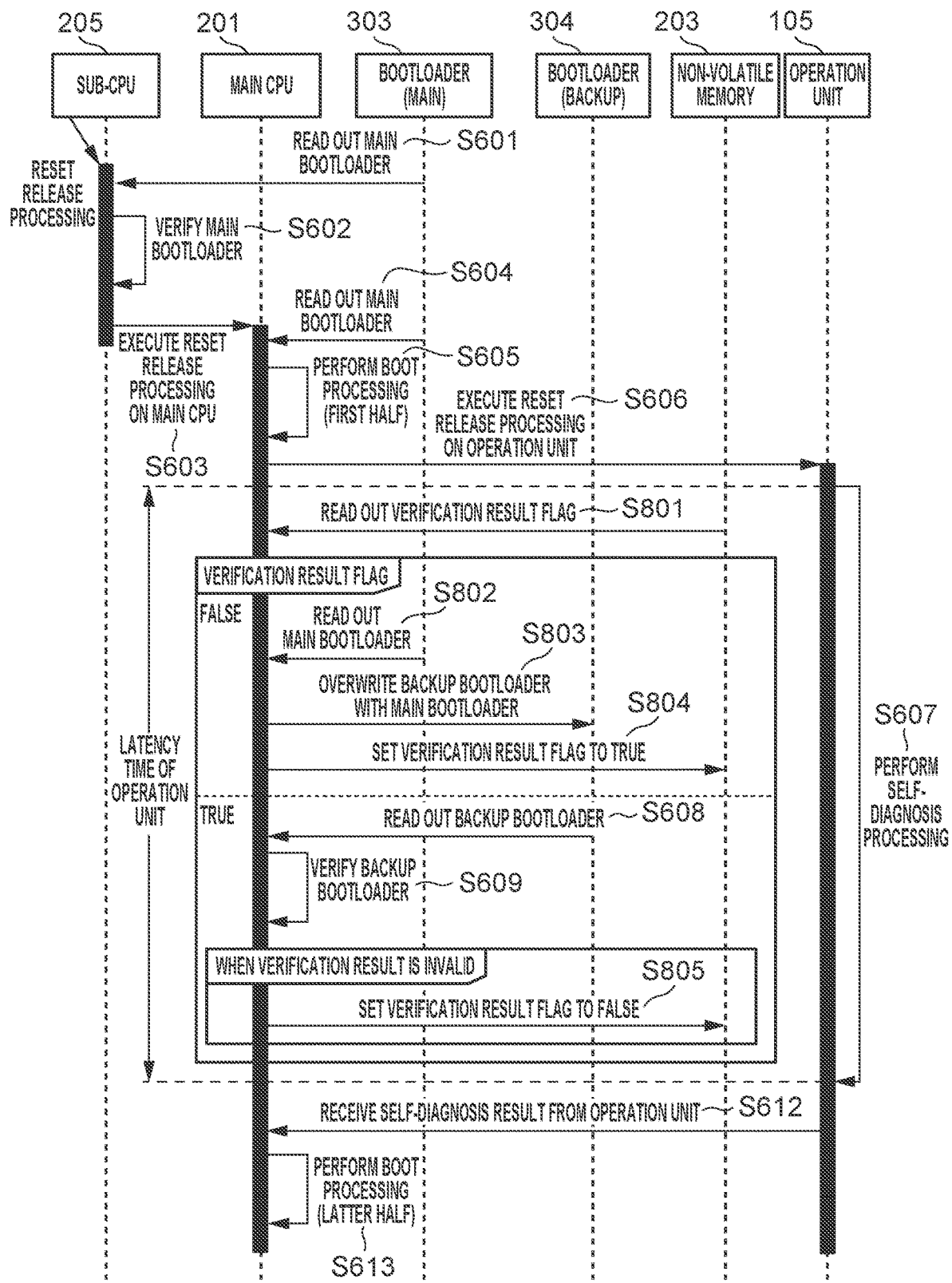
FIG. 8 is a sequence diagram illustrating verification processing and recovery processing on the backup bootloader according to one embodiment.

FIG. 8 illustrates an example where verification processing on the bootloader (backup) 304 is executed during the latency time for the self-diagnosis function of the operation unit 105 and recovery processing is executed at next boot time. In the second example embodiment, the non-volatile memory 203 stores a verification result flag to hold the verification result until the next boot processing. The verification result flag used herein refers to information indicating the result of verification processing executed on the bootloader (backup) 304 at the previous boot. "TRUE" indicates that the bootloader (backup) 304 is valid, and "FALSE" indicates that the bootloader (backup) 304 is invalid.

In step S606, the bootloader (main) 303 performs reset release processing on the operation unit 105. Then, in step S801, the verification result flag stored in the non-volatile memory 203 is read out. If the read out verification result flag indicates "TRUE", in step S608, the bootloader (backup) 304 is read out in the same manner as in the first example embodiment. Then, in step S609, verification processing is performed. If the verification result is invalid, recovery processing is performed in the first example embodiment. According to the second example embodiment, in step S805, the verification result flag stored in the non-volatile memory 203 is set to "FALSE".

On the other hand, if the verification result flag acquired in step S801 indicates "FALSE", the verification processing is not performed. In step S802, the bootloader (main) 303 is read out. In step S803, the backup bootloader is overwritten with the main bootloader. After that, in step S804, the verification result flag stored in the non-volatile memory 203 is set to "TRUE".

As described above, even when the sum of the verification time and the recovery time is longer than the latency time of the operation unit 105, the verification processing and the recovery processing are performed separately before and after reboot processing, thereby making it possible to execute boot processing with reduced boot time. The second example embodiment also illustrates an example where the latency time of the operation unit 105 is used. However, any other system may be used as long as the latency time is generated by the other system during boot processing.

FIGS. 9A to 9C are flowcharts illustrating the processing illustrated in FIG. 8. The processing illustrated in FIG. 9A is performed by the bootloader verification program. The processing illustrated in FIG. 9B is performed by the bootloader. The processing illustrated in FIG. 9C is performed by the firmware for the operation unit 105. The processing illustrated in FIGS. 9A to 9C will be described along with the processing illustrated in FIG. 8. Descriptions of processes in FIGS. 9A to 9C that are similar to those in FIGS. 7A to 7C will be omitted, and only different processes to be performed by the bootloader will be described.

In step S606, the bootloader performs reset release processing on the operation unit 105. Then, in step S801, the verification result flag stored in the non-volatile memory 203 is read out. In step S901, it is determined whether the verification result flag is "TRUE". If the verification result flag is "FALSE" (NO in step S901), the processing proceeds to step S802. Since it is determined that the verification result is invalid at the previous boot, in step S802, the main bootloader is read out. In step S803, the backup bootloader is overwritten with the main bootloader.

After that, in step S804, the verification result flag is set to "TRUE", and the processing is continued. On the other hand, if the verification result flag is "TRUE" (YES in step S901), the backup bootloader is verified in steps S608, S609, and S711, like in the processing illustrated in FIGS. 7A to 7C. If it is determined that the verification result of the backup bootloader is invalid (NO in step S711), the processing proceeds to step S805. In step S805, the verification result flag is set to "FALSE" in the second example embodiment.

Also, in the configuration according to the present example embodiment, it is both possible to enhance the robustness of the system using the automatic recovery function by increasing the number of verifications of the backup program and to prevent a decrease in user-friendliness by preventing an increase in the boot time for the entire apparatus.

The second example embodiment described above illustrates a case where verification processing on the bootloader (backup) 304 is completed during the latency time for the self-diagnosis function of the operation unit 105, but if recovery processing is performed as well as the verification processing, the sum of the verification time and the recovery time is longer than the latency time of the operation unit 105. However, in some cases, the verification time may be longer than the latency time for the self-diagnosis function. Accordingly, a third example embodiment illustrates an example where divided verification processing and divided recovery processing are performed on the backup bootloader and the entire verification processing is completed during several boot processes. Descriptions of components in the third example embodiment that are denoted by the same reference numerals as those in the first and second example embodiments will be omitted.

Figure 10:
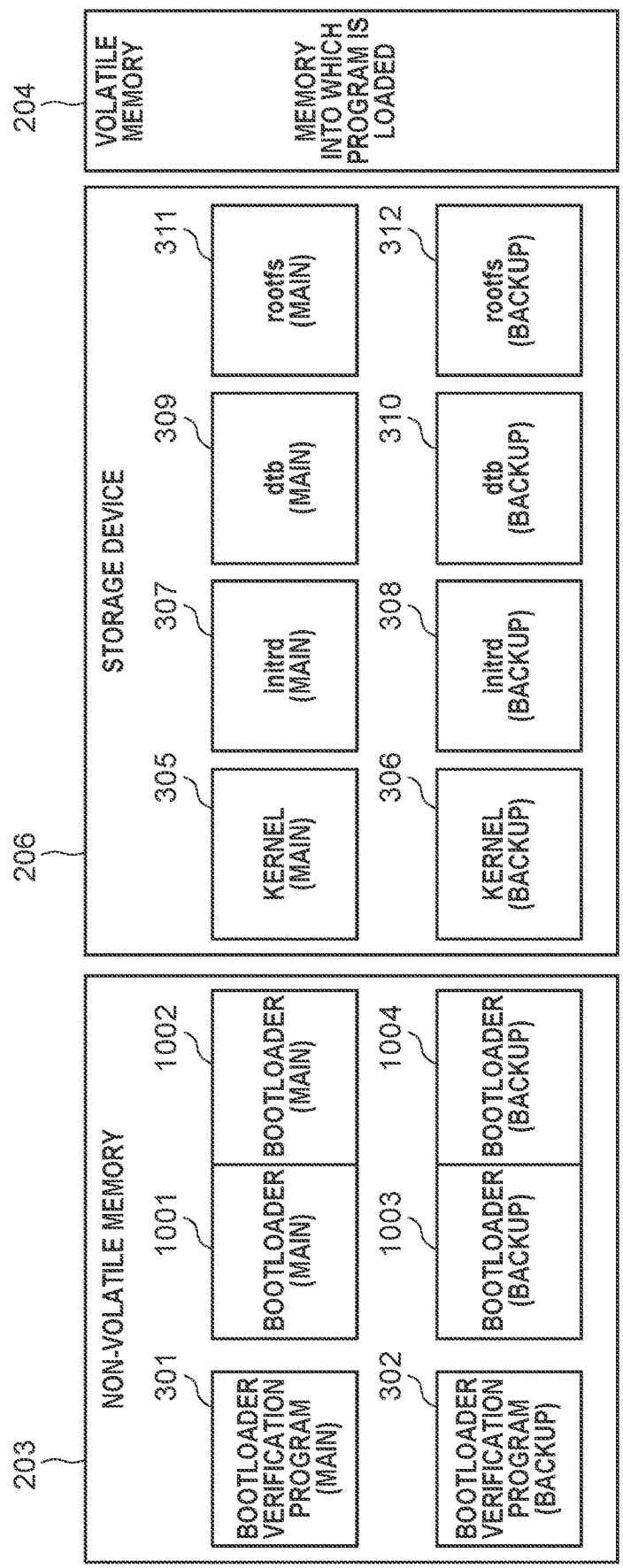
FIG. 10 is a block diagram illustrating programs according to one embodiment.

A processing sequence according to the third example embodiment is similar to that illustrated in FIG. 6 and FIGS. 7A to 7C. In the third example embodiment, the bootloader is divided into any number of bootloaders. FIG. 10 illustrates an example where the bootloader is divided into two bootloaders. The bootloader (main) 303 is divided into two bootloaders, i.e., a bootloader (main) 1001 and a bootloader (main) 1002. Similarly, the bootloader (backup) 304 is divided into two bootloaders, i.e., a bootloader (backup) 1003 and a bootloader (backup) 1004. The term "divided" used here indicates setting a range from a specific address to another specific address as a target for verification processing and recovery processing. To boot the bootloaders in practice, it may be desirable to load both the bootloader (main) 1001 and the bootloader (main) 1002.

According to the third example embodiment, in the verification processing of steps S608 and S609 illustrated in FIGS. 6 and 8, the bootloader (backup) 1003 is verified at one boot, and the bootloader (backup) 1004 is verified at the next boot. As a result, the verification of the entire backup bootloader is completed in two boot processes. The same holds true for the recovery processing in steps S802 and S803. When the verification result flag is "FALSE", the bootloader (backup) 1003 is recovered from the bootloader (main) 1001. Alternatively, when the verification result flag is "FALSE", the bootloader (backup) 1004 is recovered from the bootloader (main) 1002.

The verification processing and recovery processing are performed in units of prescribed blocks as described above, thereby making it possible to reduce the time for the verification processing and recovery processing to be performed at one boot. The method according to the third example embodiment makes it possible to flexibly change the processing time by more finely setting the blocks based on which divided verification processing and divided recovery processing are performed. Like in the first and second example embodiments, the latency time of the operation unit 105 is also used in the third example embodiment. However, any other system may be used as long as the latency time is generated by the other system during boot processing.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-156318, filed Sep. 27, 2021, which is hereby incorporated by reference herein in its entirety.

What is claimed is:

1. An information processing apparatus including a non-volatile storage unit configured to store a boot program for booting a system and a backup program for the boot program, the information processing apparatus comprising:
a first verification unit configured to verify whether the backup program is valid;
a second verification unit configured to verify whether firmware for controlling a predetermined member is valid; and
an overwrite unit configured to overwrite an invalid boot program with a valid boot program,
wherein the first verification unit verifies whether the backup program is valid during a period in which the second verification unit verifies whether the firmware is valid,
wherein the overwrite unit overwrites the backup program with the boot program based on verification that the backup program is invalid by the first verification unit,
wherein the verification by the first verification unit is executed and the overwriting by the overwrite unit is not executed during the verification by the second verification unit based on booting of the information processing apparatus, and
wherein based on booting of the information processing apparatus from an off-state of the information processing apparatus caused by shutdown corresponding to the booting in a case where the shutdown of the information processing apparatus is executed, the verification by the first verification unit is not executed and the overwriting by the overwrite unit is executed.

2. The information processing apparatus according to claim 1, wherein the predetermined member is an operation unit configured to receive an operation from a user.

3. The information processing apparatus according to claim 2, wherein the second verification unit is executed by the operation unit.

4. A control method for an information processing apparatus including a non-volatile storage device configured to store a boot program for booting a system and a backup program for the boot program, the control method comprising:
verifying whether firmware for controlling a predetermined member is valid;
verifying whether the backup program is valid during the verification whether the firmware is valid; and
overwriting the backup program with the boot program based on verification that the backup program is invalid,
wherein the verification whether the backup program is valid is executed and the overwriting is not executed during the verification whether the firmware is valid based on booting of the information processing apparatus, and
wherein based on booting of the information processing apparatus from an off-state of the information processing apparatus caused by shutdown corresponding to the booting in a case where the shutdown of the information processing apparatus is executed, the verification whether the backup program is valid is not executed and the overwriting is executed.

5. The control method for the information processing apparatus according to claim 4, further comprising:
verifying whether the boot program is valid based on booting of the information processing apparatus; and
executing the boot program based on verification that the boot program is valid.

6. The control method for the information processing apparatus according to claim 4, wherein the predetermined member is an operation unit configured to receive an operation from a user.

7. An information processing apparatus including a non-volatile storage unit configured to store a boot program for booting a system and a backup program for the boot program, the information processing apparatus comprising:
a first verification unit configured to verify whether the backup program is valid;
a second verification unit configured to verify whether firmware for controlling a predetermined member is valid;
an overwrite unit configured to overwrite an invalid boot program with a valid boot program;
an execution unit configured to execute the boot program; and
a third verification unit configured to verify whether the boot program is valid, wherein the first verification unit verifies whether the backup program is valid during a period in which the second verification unit verifies whether the firmware is valid, wherein the overwrite unit overwrites the backup program with the boot program based on verification that the backup program is invalid by the first verification unit, wherein the third verification unit verifies whether the boot program is valid based on booting of the information processing apparatus, and the execution unit executes the boot program based on verification that the boot program is valid, wherein the third verification unit verifies whether the backup program is valid based on verification that the boot program is invalid, and wherein the second verification unit executes the verification of the firmware based on verification that the backup program is valid by the third verification unit.

8. The information processing apparatus according to claim 7, wherein the overwrite unit overwrites the boot program with the backup program during execution of the verification of the firmware by the second verification unit based on verification that the backup program is valid by the third verification unit.

9. The information processing apparatus according to claim 7, wherein the verification by the first verification unit is executed by a first processor and the verification by the third verification unit is executed by a second processor.

10. The information processing apparatus according to claim 7, wherein the predetermined member is an operation unit configured to receive an operation from a user.

11. The information processing apparatus according to claim 10, wherein the second verification unit is executed by the operation unit.

* * * * *